Feb. 24, 1970   G. JAY ETAL   3,497,085
BALE ELEVATOR CHUTE CONSTRUCTION
Filed June 10, 1968   5 Sheets-Sheet 1

INVENTOR.
GEORGE JAY
EVERETT V. RANKINS
BY
Julian Caplan
PATENT ATTORNEY

Feb. 24, 1970   G. JAY ETAL   3,497,085
BALE ELEVATOR CHUTE CONSTRUCTION
Filed June 10, 1968   5 Sheets-Sheet 3

INVENTOR.
GEORGE JAY
EVERETT V. RANKINS
BY
Julian Caplan
PATENT ATTORNEY

Feb. 24, 1970   G. JAY ETAL   3,497,085
BALE ELEVATOR CHUTE CONSTRUCTION
Filed June 10, 1968   5 Sheets-Sheet 4
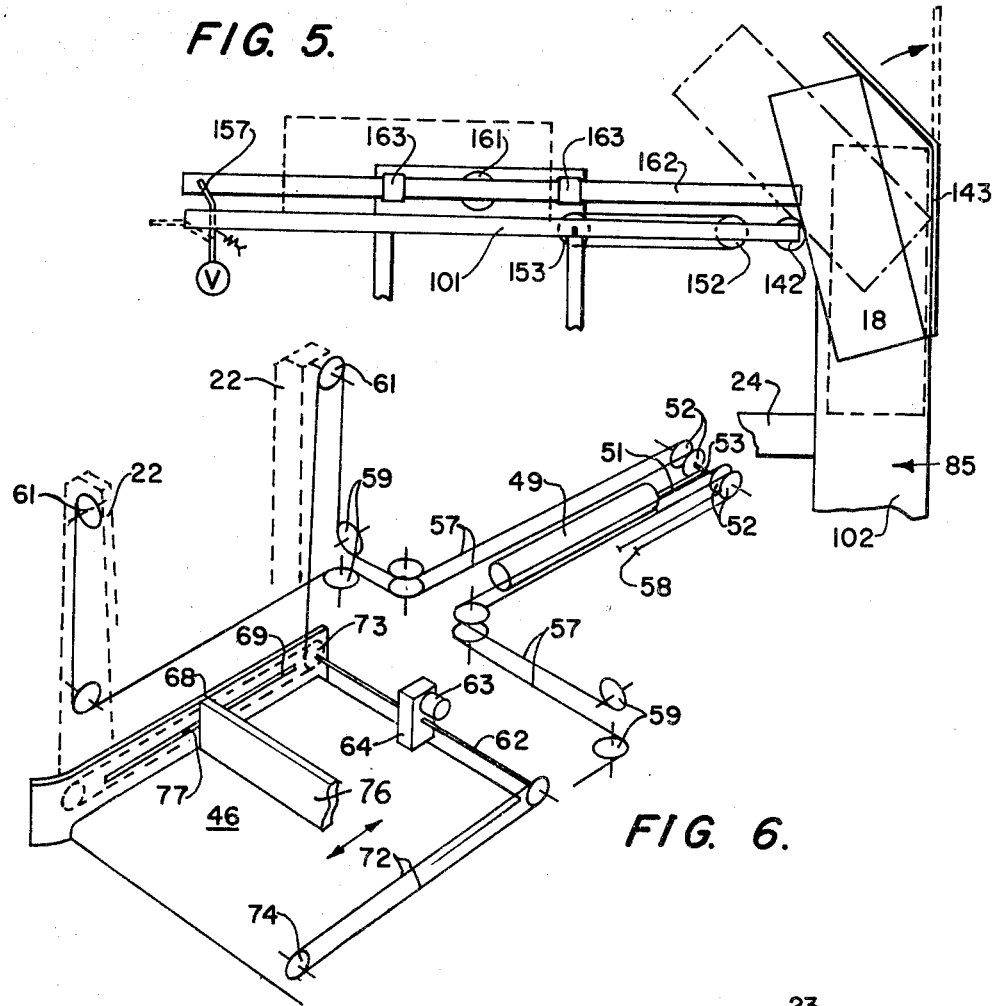
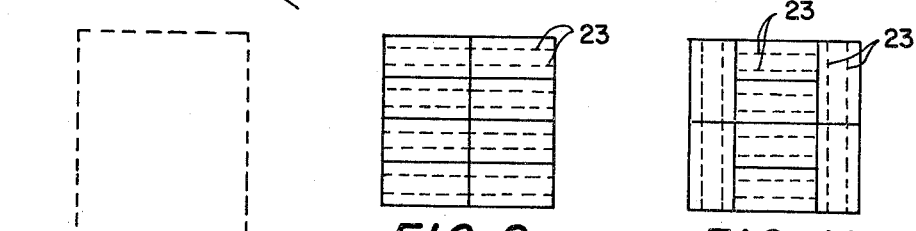
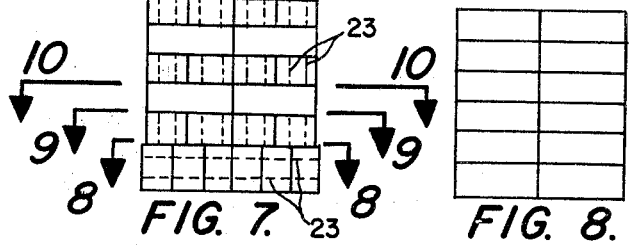
INVENTOR.
GEORGE JAY
EVERETT V. RANKINS
BY Julian Caplan
PATENT ATTORNEY Feb. 24, 1970

G. JAY ETAL 3,497,085

BALE ELEVATOR CHUTE CONSTRUCTION

Filed June 10, 1968

INVENTOR.
GEORGE JAY
EVERETT V. RANKINS
BY
Julian Caplan
PATENT ATTORNEY

United States Patent Office 3,497,085
Patented Feb. 24, 1970

3,497,085
BALE ELEVATOR CHUTE CONSTRUCTION
George Jay and Everett V. Rankins, Manteca, Calif., assignors to the United States of America as represented by the Secretary of the Army
Continuation-in-part of application Ser. No. 569,503, Aug. 1, 1966. This application June 10, 1968, Ser. No. 735,890
Int. Cl. B60p 1/38; B65g 57/32
U.S. Cl. 214—6                                           6 Claims

ABSTRACT OF THE DISCLOSURE

A bale stacking machine is provided with an elevator chute to lift hay bales or the like from ground level to an elevated platform. The lifting of the bale is accomplished by chains disposed along the rear of the chute, the chains being provided with lugs at spaced intervals to engage the bale and raise the same. The front of the chute is provided with horizontal transverse rollers and at its upper end the front of the chute frame is retractable forwardly. When the front of the chute frame is retracted, the bale reaching the top of the chute falls forwardly into longitudinal horizontal position. On the other hand, when the chute is in projected position, a bale turning device tips the bale as it reaches the top of the chute into a transverse horizontal position. Means is provided for moving the bale after deposit at the top of the chute in either longitudinal or transverse direction to form a pattern of bales.

---

This application is a continuation-in-part of application Ser. No. 569,503 filed Aug. 1, 1966, now Patent No. 3,400,839.

A principal purpose of the present invention is to provide a chute construction which enables the operator to discharge hay bales from the top of the chute lying either longitudinally or transversely of the machine. By depositing some of the bales longitudinally and others transversely a layer of bales of selected pattern may be formed. By forming layers of different patterns, a stack of bales may be built up which is interlocked and hence has improved stability.

The present invention provides a simple means for locating the bales either in longitudinal or transverse direction, thereby eliminating manual turning of the bales and also simplifying the mechanical structure necessary to turn the bales by mechanical means.

This invention relates to an improved bale stacking apparatus and method. More particularly, the invention relates to a machine which picks up conventional hay bales deposited on the ground by a conventional hay baling machine, arranges them in a stack of a pattern of layers of bales, and may be used to transport the stack to a deposit location, and then discharges the stack, while maintaining the pattern. The pattern is shaped to facilitate subsequent transportation of stacks in conventional highway hay transport trucks. Thus the subsequent restacking required after use of other field stacking machines in order to rearrange the bales in a stable stack for transportation is eliminated in the present invention. Accordingly, the invention also relates to the stack of bales produced in accordance with the apparatus and method.

A principal advantage of the invention is the fact that the machine arranges the bales in a pre-selected pattern of layers. In a preferred form of the invention the horizontal arrangement of each layer is eight feet square and preferably seven layers form the stack. In most of the layers the bales extend in two rows of four bales each, but in some of the layers some of the bales are arranged in an interlocking pattern which stabilizes the stack, eliminating the need for subsequent rearrangement.

A further feature of the invention is the fact that the machine is designed to transport a stack of bales picked up in the field to a place of deposit such as the edge of the field adjacent a highway, where the stack is later placed on a truck and transported along the highway. On the other hand, the machine can also be used for transportation over highways.

A further feature of the invention is the fact that the machine may be self-propelled and controlled by one man, thereby reducing the labor presently required in stacking bales and also materially reducing the amount of physical labor required for such purpose.

Another advantage of the invention is the reduction in the amount of movement of the bale as compared with other machines of this general type. Reduction in movement of the bales reduces the likelihood of loosening the bales or the baling wires or scattering the hay. It also reduces loss of nutritional value of leaves which might otherwise be lost.

An important feature of the present invention is the fact that the elevator platform may be raised and the stack discharged at various elevations, such as directly onto the bed of a truck or on top of a stack previously deposited on the ground. This feature enables the operator to have ready access in the event that manual corrections of malfunctioning are required.

A further feature of the invention is the fact that the mechanism for pushing the stack off of the elevator platform moves vertically with the platform and horizontally relative to the platform, thereby providing discharge of the stack at any elevation.

Another feature of the invention is the provision of means for tipping the bales in the lower layer of the stack on edge so that the baling wires are out of contact with the ground. Rusting of the wires during prolonged periods of storage is avoided by such tipping.

Still another feature of the invention is the provision of means for turning selected bales from longitudinal to transverse position in order to tie the stack together. Operation of the mechanism for performing this operation is simple and requires a minimum of manual control.

Many additional advantages of the invention result from the fact that the stack pattern (with interlocking bales stabilizing the stack) is established by the apparatus when the bales are initially set in place and there is no need to rearrange the stack at any time, up to the time of consumption.

One such advantage is that if a baling wire breaks in the stack or if a bale is otherwise broken, the other bales hold the hay in place, reducing loss.

Another such advantage is the fact that the stack tends to settle, the weight of superimposed bales causing compression of lower bales in an interlocking pattern which further stabilizes the stack and aids in maintaining the shape of the stack when it is stored, lifted on a truck or transported.

Important nutritional values occur in the practice of the invention. Thus handling of the bales from field to consumer is reduced. This saves leaves and foliage and also insures that only a minimum surface area of each bale is exposed to sun and weather, thereby reducing discoloration and withering.

The foregoing results in uniformity of quality since a package of 56 bales (e.g.) is formed and maintained intact until fed to cattle and the parts of the bales not exposed to atmosphere are maintained unaffected by sun and weather.

It is customary in prior hay handling to stack bales at the edge of a field and maintain the stack intact for 30–45 days while the cure of the hay is completed. Hay balers refer to hay "sweating" during this portion of the curing cycle. If the stack is disturbed in this time period, the "sweat" is "broken" and the hay is less palatable to cattle and its nutritional value is believed to be impaired. The stable stack of the present invention, however, can be transported during the sweating period because lifting and transporting the package or stack does not disturb the bales or enable air to interfere with the sweating process.

The present invention has been developed in the Central Valley of California where standard alfalfa hay bales are dimensioned 16 x 23 x 48 inches and weigh approximately 125 pounds. The machine hereinafter described stacks either 56 such bales in seven layers of eight bales each, or 60 bales in a stack of twelve bales on the bottom and eight on the other six layers. However, the machine can readily be adapted to handle bales of other dimensions and the number of bales in the stack and arrangement of layers may be varied by adjustment of dimensions of the machine which will readily occur to one skilled in this art.

In the description which follows, the machine is self-propelled. However, the machine may be tractor-drawn and actuated in whole or in part by power take-off from the tractor or a ground wheel.

Other objects of the present invention will become apparent upon reading the following specification and referring to the accompanying drawings in which similar characters of reference represent corresponding parts in each of the several views.

In the drawings:

FIG. 5 is a fragmentary sectional view taken substantially along the line 5—5 of FIG. 3.

FIG. 6 is a schematic perspective view, with parts broken away, showing the elevator platform and discharge pusher actuating mechanisms.

FIG. 7 is a side elevation of a stack formed in accordance with the invention and showing in dotted lines a second stack superimposed on the first.

FIGS. 8–10 are plan views of three different layers of a stack as viewed substantially along corresponding section lines in FIG. 7.

Figure 1:
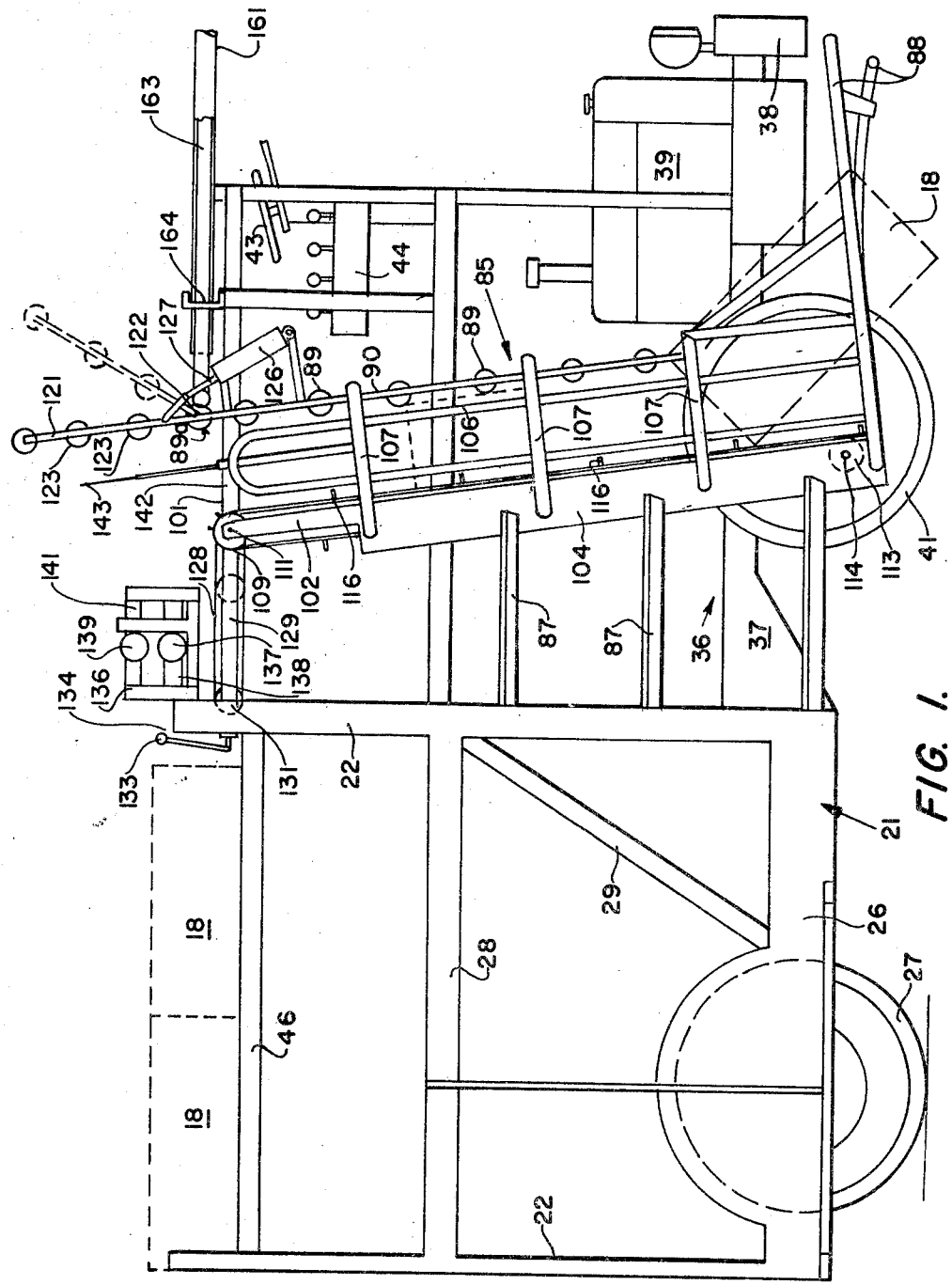
FIG. 1 is a side elevation of the machine.
Figure 2:
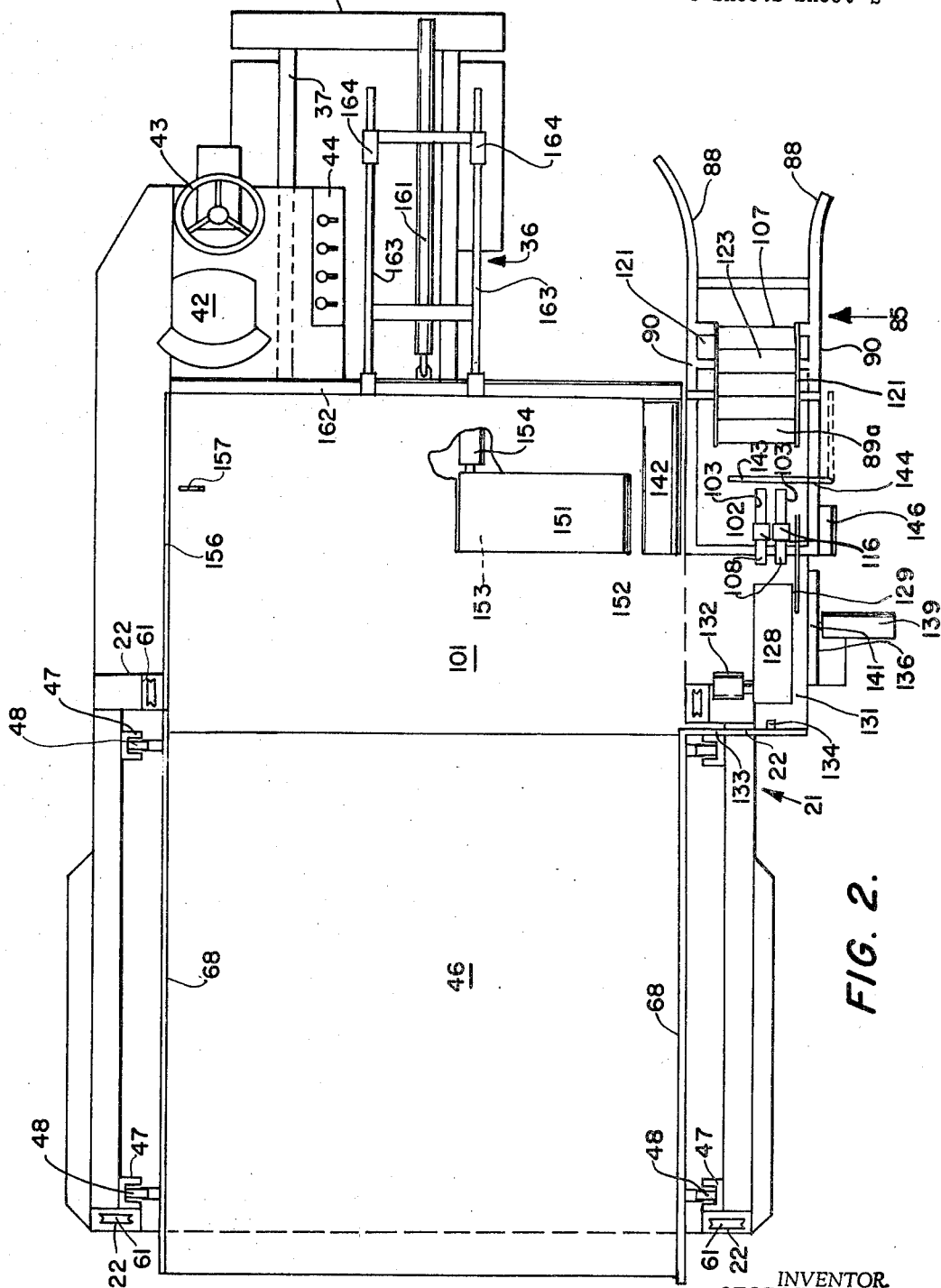
FIG. 2 is a top plan.

For the purpose of the following description, it will be assumed that the machine is to handle a conventional hay bale 18 formed by conventional baling machines having cross-sectional dimensions of 16" x 23", as determined by the shape of the baling chamber. On the other hand, the lengths of such bales although nominally 48 inches, actually vary because of mechanical imperfections of the length limiting mechanisms of the machine. The bales are held in place by baling wires, usually three wires per bale. Such bales are discharged from the tail gate of the machine onto the field with one of the 16" x 48" sides resting on the ground and with the 48" dimension extending longitudinally of the path of travel of the baling machine, which path of travel is the same as that of the instant machine. The present invention picks up and stacks such bales as hereinafter described.

The ultimate pattern of the stack is shown in FIG. 7, although subject to certain variations within the limitations of the present machine. There are seven layers of bales. As hereinafter explained, the bales on the bottom layer optionally may be tilted to rest on their 16" x 48" sides with their binding wires off the ground, in which case there are preferably twelve bales on the bottom layer in two rows of six bales and a total of sixty bales in the stack. Alternatively, the bottom layer may comprise eight bales resting on their 23" x 48" sides in two rows of four bales, in which case there are 56 bales in the stack. Referring to FIG. 8, the bales of the lowermost layer are tilted to rest on their 16" x 48" faces and the nominal 48" dimension edges extend transversely of the machine so that there are two rows meeting at the longitudinal center line of the machine, and each row consisting of six bales. The second, middle and two uppermost layers each consist of eight bales in two transverse rows, each bale resting on one of its 23" x 48" sides, as shown in FIG. 9. The third and fifth layers are shown in FIG. 10. In such layers there are four longitudinal bales in a row down the center and two transversely extending bales at each end. The interlocking of the transversely disposed bales in the stack tends to stabilize the stack and reduce any tendency to tip or slide during handling of the stack.

The main frame 21 of the machine has four vertical corner posts 22. The two front posts 22 are interconnected adjacent their lower ends by a horizontal transverse member 23 and at least one horizontal transverse member 24 elevated above the bottom member. At each side is a bottom longitudinal horizontal member 26 which is supported by ground engaging rear wheels 27. A longitudinal side member 28 and cross ties 29 rigidify the sides of the main frame. The back of main frame 21 is open for discharge of the stack.

Forwardly of main frame 21 and rigidly connected to the horizontal member 23 is front frame 36 consisting of longitudinal and transverse members 37, 38 which support engine 39 which provides motive power for the front wheels 41 and also drives a pump (not shown), which energizes the various hydraulic cylinders and motors hereinafter described. An operator's seat 42 is located on frame 21 at the top on the left-hand side of the machine having a steering wheel 43 to turn front wheels 41 and also having a console 44 for a plurality of hydraulic controls conveniently located beside the operator to control energization of the various motors and cylinders.

Normally horizontal and vertically reciprocating bale platform 46 is disposed within the confines of the four corner posts 22. Preferably, each post 22 has an inward facing channel-like track 47, and each corner of platform 46 is provided with a rotatably mounted guide roller 48 which fits into track 47. Platform 46 has horizontal dimensions to accommodate the maximum dimensions of a layer of bales to be handled. A horizontally disposed double-acting hydraulic cylinder 49 is mounted on front frame 36. The forward extending rod 51 of cylinder 49 is provided with four pulleys 52 rotatable on shaft 53. Four cables 57 are fixed to frame 46 by clips 58 and each passes around a pulley 52, and the cables are guided by pulleys 59 disposed on frame 21 so as to pass around top pulleys 61 rotatably mounted at the top of each corner post 22. The ends of the cables 57 are attached to each of the four corners of platform 46. Extension and retraction of rod 51 controls vertical movement of platform 46, and because of the arrangement of the pulleys 59, 61 and cables 57, there is a two-to-one movement.

The uppermost elevation of platform 46 is indicated in FIG. 1, and platform 46 is raised to such level for deposit of the first layer of bales (the lowermost layer of the ultimate stack). After the first layer has been deposited, platform 46 is lowered 23 inches (by means of cylinder 49) and the second layer is deposited, and the procedure is repeated until seven layers have been deposited.

After the machine has been transported to the position of deposit and platform 46 moved to the proper elevation, the stack may be discharged. For such purpose there is mounted on elevator platform 46 a transverse shaft 62 driven by a reversible hydraulic motor 63 through gear box 64. Side members 68 extending longitudinally on either side of platform 46 are provided with longitudinal slots 69. Endless chains 72 on either side extend on their bottom stretches at the level of slots 69. On either end of shaft 62 is a drive sprocket 73 around which chain 72 passes and at the opposite end are idler sprockets 74. Mounted transversely above the level of platform 46 is a pusher 76, the opposite ends of which have extensions 77 extending through slots 69, fixed to chains 72. Accordingly, as motor 63 is driven, pusher 76 is moved forward and backward over the top of platform 46.

Bales 18 are deposited by the baling machine in a line at spaced intervals resting on one of their 16″ x 48″ sides. The operator steers the machine along such line so that the right hand side of the machine encounters the bales in order. Bale pickup chute 85 on the right side of the machine is generally upwardly-rearwardly tilted and held in such position by braces 87 attached to the right front corner post 22.

In the modification of the invention shown in FIGS. 1 to 6 inclusive, chute 85 is located adjacent the front right hand corner of the machine and tilts slightly rearward from slightly above ground level upward to the top loading platform 101. The frame of chute 85 comprises a rear plate 102 apertured in a pair of longitudinal slots 103 which extend from the bottom to the top of the machine. The side edges 104 of the plate are bent backward at their edges to shield the moving parts of the mechanism from contact with external objects. The sides of the chute frame are formed with longitudinally extending round bars 106 to reduce friction. At the front of the chute frame along either side edge are longitudinal bars 90 in which are mounted the ends of rollers 89, said rollers 89 extending transversely-horizontally of the machine. The sides and front of the chute frame are connected to the rear plate and reinforced by U-shaped bars 107 disposed at spaced intervals longitudinally of the chute frame, there being three such bars shown in the accompanying drawings. Extending forwardly of the frame at the bottom are horizontal guides 88 having curved forward ends. Bales 18 encountered by the machine are received between the guides 88 and directed to the bottom of chute 85. Mounted on the rear of the chute 85 and preferably displaced outwardly relative to the center line thereof is a pair of continuous chains 108. Chains 108 are driven by sprockets 109 on top shaft 111, which shaft is in turn driven by a hydraulic motor (not shown). Idler sprockets 113 are located on transverse horizontal idler shaft 114 at the bottom of the chute frame. Each of the chains 108 has projecting lugs 116 at spaced intervals. Lugs 116 protrude forwardly through slots 103 and engage the bale 18 and lift it up the chute so that the longitudinal dimension of the bale extends longitudinally of the chute.

Sprockets 109 are located at about the level of loading platform 101 which extends horizontally transversely of the machine. The front edge members 90 terminate at upper permanent roller 89a spaced about three inches above the level of sprocket 109. Pivotal side edge members 121 extend above the level of roller 89a and are pivoted to edge members about shaft 122, which is the axis of rotation of roller 89a. Mounted between pivotal members 121 is a plurality of rollers 123, here shown as three in number.

Mounted on the top of chute 85 is a hydraulic cylinder 126, the rod 127 of which is connected to the pivotal section of the front of the chute. Actuation of cylinder 126 moves the upper frame from a projected solid line position as viewed in FIG. 1 to a retracted dotted line position for a purpose which is hereinafter explained in detail.

Rearward of sprockets 109 and about at the level thereof is a longitudinal horizontal belt 128 which passes over front and rear drive rollers 129, 131. The rearward roller 131 is power driven by hydraulic motor 132. A transverse horizontal stop 133 is provided at the side of the rear edge of loading platform 101 to limit rearward movement of bale 18 on belt 128. A finger 134 may be positioned on stop 133 which is contacted by a bale when it reaches the stop and is connected by means forming no part of the present invention to a valve (not shown) controlling hydraulic motor 132 to discontinue movement of belt 128 when the bale has reached the back edge of platform 101.

Located above the level of belt 128 to the side thereof is frame 136 which mounts a horizontal transverse cylinder 137. The piston of cylinder 137 moves longitudinal horizontal bar 138 which is movable to push a bale mounted on belt 128 inwardly. Optionally, above the level of push cylinder 137 is a second or tipping cylinder 139 also mounted horizontally transversely. The rod of cylinder 139 is connected to longitudinal horizontal tipping rod 141. When tipping cylinder 139 is energized, tipping rod 141 contacts a bale located on belt 128 substantially above its center of gravity and thus tilts the bale about its inner bottom longitudinal edge. The push bar 138 when projected completes the tilting of the bale and also pushes it inwardly onto loading platform 101. When it is not desired to tip a bale, the tipping cylinder 139 is not energized.

Located along the upper edge of chute 85 along the right side edge of platform 101 is a longitudinal horizontal roller 142. On the outer edge of chute 85 is an upward extending bale turning rod 143 having a curved upper end. Rod 143 can pivot about its vertical axis between an inoperative position where the curved end extends parallel to the length of the machine to operative position where the curved end extends transversely. To turn rod 143 between such positions, a crank 144 is connected thereto and said crank is connected to the piston rod of cylinder 146. By energizing cylinder 146, rod 143 may be turned to transverse position.

Disposed inwardly of roller 142 is horizontal transverse conveyor belt 151. Belt 151 passes over outer and inner rollers 152, 153 and inner roller 152 is power driven by an hydraulic motor 154. Thus bales turned inward by turning rod 143 pivot about roller 142 and fall onto belt 151 which moves the bales transversely to the left of the machine. A stop 156 on the left side of the machine limits transverse bale movement. Finger 157 when contacted by a bale moved fully to the left turns a valve de-energizing motor 154 driving belt 151.

At the front of the platform and extending forwardly of the machine is a longitudinal horizontal cylinder 161. The rod of cylinder 161 extends rearwardly and is connected to a transverse horizontal push rod 162. Guides 163 are connected to push rod 162 and extend horizontally longitudinally and are received in sleeves 164 mounted on the frame to maintain the alignment of rod 162.

Figure 3:
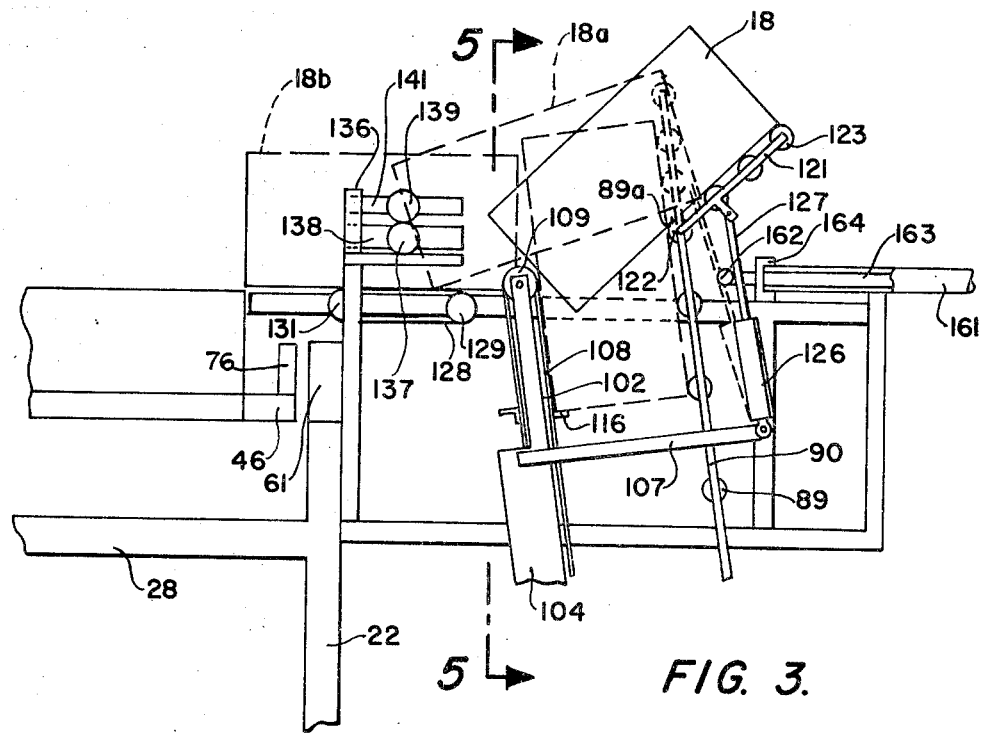
FIG. 3 is an enlarged fragmentary side elevation of a portion of the machine.
Figure 4:
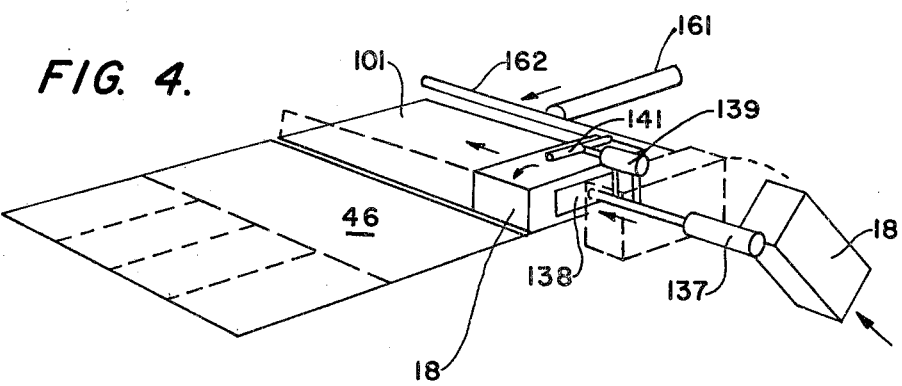
FIG. 4 is a fragmentary, partly schematic perspective view showing tilting of the bale.

In operation, a bale 18 lying on one of its 48 x 16 inch dimensions with the 48 inch dimensions extending longitudinally is encountered by the guides 88 projecting forwardly of the bottom of chute 85 and is guided into contact with lugs 116 on chains 108. Said lugs 116 lift the rearward end of the bale off the ground and raise it into the bottom of chute 85. Continued movement of the chains 108 raises the bale up the chute. With upper chute frame members 121 in retracted or dotted line position as viewed in FIG. 1, the turning bar 143 is located longitudinally or in inoperative position. As best shown in FIG. 3, the upper end of bale 18 tilts longitudinally forward, resting on rollers 123 while lugs 116 continue to lift the bale and force it upward and forward to solid line position viewed in FIG. 3. The chains continue to lift the lower end of bale 18 up over the top of sprockets 109 and then to move the bale longitudinally rearward to position 18a. Then belt 128 moves the bale to position 18b extending longitudinally on one 16 x 48 inch face, in fact, the same side which rested on the ground. Bale 81 moves rearwardly until it encounters stop 133 and thereupon belt 128 is stopped either manually or by automatic control. It is desirable that the first layer of bales formed rest on one of the 16 x 48 inch faces because in such position the baling wires are not in contact with the ground and hence rusting of the wires is avoided. Accordingly, the bales in the first layer are not tilted. Therefore, in forming the first layer, cylinder 139 is not energized. Thus each bale reaching the position at the rear of belt 128 is pushed by pusher bar 138 transversely onto platform 101. Such operation is continued sequentially until the width of the platform is filled with six bales extending longitudinally horizontally with one 16 x 48 inch face downmost. When the six bales are positioned, the cylinder 161 is energized causing pusher bar 162 to push the six bales back off the back end of loading platform 101 and onto the elevator platform 46 which is now located at or slightly below the level of loading platform 101. Pusher bar 162 is then retracted to initial position. The operation is repeated and six additional bales are positioned extending transversely on loading platform 101. Thereupon pusher bar 162 is again energized pushing the second row of six bales rearwardly and these bales also push the first row rearwardly until all 12 bales are located on the platform. See FIG. 8. The platform 46 is then lowered one layer thickness (23 inches), although subsequent layers are lowered 16 inches.

The second layer of bales is preferably deposited with each bale on one of its 23 x 48 inch faces with the 48 inch dimension extending longitudinally of the machine. For such purpose, the upper subframe member 121 is located in dotted line position as shown in FIG. 1 and the turning bar 143 is in inoperative position. Therefore, each bale travels into longitudinal-horizontal position onto belt 128 on one of its 16 x 48 inch faces downmost as in forming the first layer. However, in order to tilt the bale onto a 23 x 48 inch face, tilt cylinder 139 is first energized causing the bale to tilt about its bottom longitudinal inner edge and such tilting is supplemented by the sequential operation of the pusher cylinder 137 which completes the tilting operation and also pushes the bale off belt 128 and onto the loading platform 101. The next bale then is tilted and pushed inward in the same manner, pushing the first bale inward one width. This operation is continued until there are four bales in a row. Thereupon the rearward pusher bar 162 is energized as has previously been described, pushing the four bales rearwardly off loading platform 101 and onto the top of the first layer of bales.

A second row of bales is deposited in the same manner as the first row and push bar 162 then pushes the second row off the loading platform and the second row pushes the first row rearward until both rows are off the platform. See FIG. 9. Thereupon the platform is lowered 16 inches. It will be understood that where it is not essential that the bales be deposited on their narrowest faces, the first layer of bales can be made in the same manner as the second layer which has just been described.

In forming the third layer of bales, a tie is formed along each end. For such purpose, the upper subframe members 121 are moved by cylinder 126 into projected or solid line position as viewed in FIG. 1 and turning rod 143 is turned to operative or transverse position. As each bale reaches the top of the chute, its upper end contacts turning rod 143 which forces the upper end transversely inwardly, the bale pivoting around roller 142. Inward movement is continued by belt 151. A second bale follows the first and the second transverse bale pushes the first one inwardly to longitudinal stop 156 on the left-hand side of the machine. Finger 157 is contacted by the left edge of the first transverse bale, actuating a valve to de-energize motor 154 to discontinue movement of belt 151. Thereupon the pusher cylinder 161 is energized and bar 162 pushes the first two transverse bales rearward off loading platform 101 onto the top of the second layer of bales. Following this operation, upper front chute subframe members 121 are retracted and turning bar 143 returned to inoperative position as in the formation of the second layer of bales. Four bales are then tilted on their 23 x 48 inch faces extending transversely of the machine as in forming the second layer. Pusher bar 162 is then actuated pushing the four longitudinally disposed bales off loading platform 101 and also pushing the first two transverse bales rearwardly. Thereupon the subframe members 121 are retracted and turning rod 143 returned to operative position and two more transverse tie bales are deposited on the loading platform in the same manner as the first two tie bales. Thereupon pusher bar 162 is energized pushing the transverse bales rearwardly off the rear edge of the loading platform 101 and these in turn push the four longitudinal bales and the first two transverse bales rearward until all eight bales are off the loading platform and on top of the second layer of bales. See FIG. 10.

The stack is formed with layers of various patterns. In a preferred form of the invention, the fourth layer is formed the same as the second, the fifth layer is formed the same as the third, and the sixth and seventh layers are formed the same as the second. Where it is desired to deposit a second stack on top of a first stack, it is usually desirable that the bottom-most or first layer be formed identical with the second—i.e. that the first layer be tilted so that all of the bales are resting on a 23 x 48 inch face. (See dotted line stack in FIG. 7.)

The complete stack of bales (FIG. 7) is now in position on elevator platform 46. It consists of a bottom layer (FIG. 8) either eight or twelve bales disposed longitudinally with either their broad sides or their narrow sides downmost depending upon whether the bottom layer has been tilted. There are eight bales in each of the other six layers. Hence the stack consists of either 56 or 60 bales. The stack is stabilized by the presence of the longitudinal tie bales on the ends of the third and fifth layers which resist any tendency of the stack to tilt.

The machine then moves to the point of deposit. If the stack is to be deposited on the ground, platform 46 is lowered to downmost position and pusher 76 is caused to move rearwardly as the machine moves forwardly forcing the entire stack off the platform and onto the ground.

However, if it is desired to deposit the bales at a higher elevation than the ground, elevator platform 46 is raised to the desired level and pusher 76 energized to push the stack off. This can be done either at the level of the bed of a truck, or at the level of the top of a pre-existing stack (see dotted lines in FIG. 7) so that a second stack may be deposited on top of the first stack.

Figure 11:
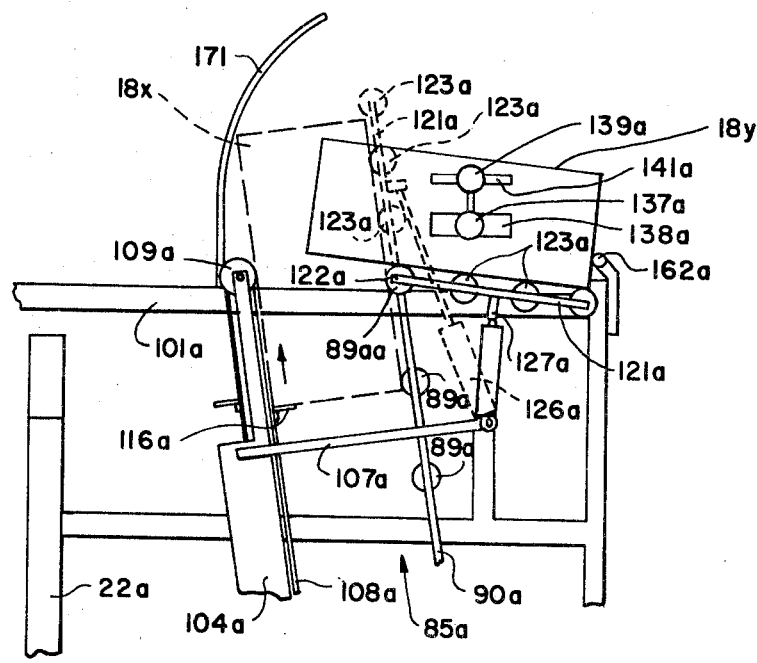
FIG. 11 is a view similar to FIG. 3 of a modification.
Figure 12:
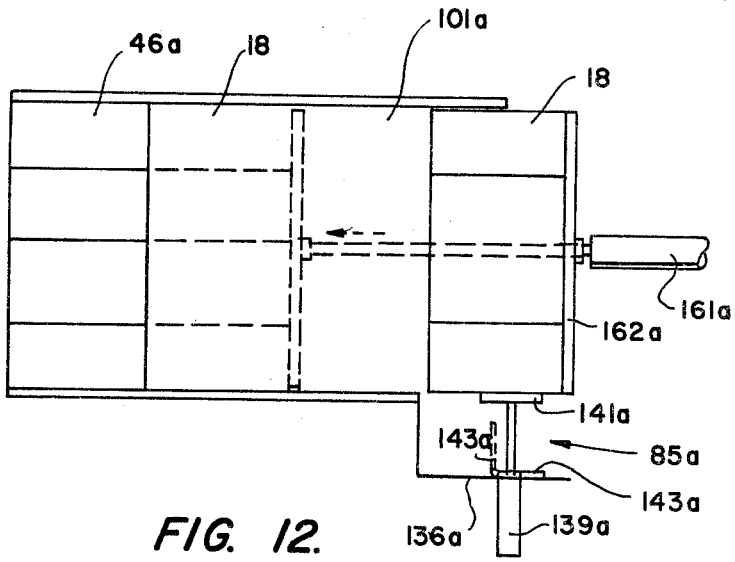
FIG. 12 is a schematic plan of the modification of FIG. 11.

The modification shown in FIGS. 11 and 12 differs from that shown in the preceding modifications in certain respects. It is also similar in other respects. Corresponding parts are indicated by the same reference numeral followed by the subscript *a*.

One difference between the modifications best shown in FIG. 11 and that shown in FIG. 3 is the amplitude of retraction of the upper section members 121*a* of the front of the elevator chute frame. The projected position of said section is shown in dot and dash lines in FIG. 11. The retracted position is shown in full lines with the subframe slanted slightly downwardly forwardly. The lateral push mechanism 136*a*–141*a* is moved forwardly in FIG. 11 from the position shown in FIG. 3 so that it is above the upper front chute subframe members 121*a* in their fully retracted position. A second or tipping push rod 141*a* may be used in the modification of FIG. 11 similar to that shown in FIG. 3.

In the operation of the mechanism shown in FIGS. 11 and 12, when the upper chute section is in fully projected or dot-and-dash position, tilting bar 143*a* similar to bar 143 of FIG. 5 is in operative position overhanging the upper end of chute 85a. As each bale reaches the top of the chute it contacts bar 143a and is turned inwardly so that it extends transversely of the machine. The mechanism for moving the bales transversely inwardly is similar to the elements 151–154 shown in FIG. 2 but is omitted from FIGS. 11 and 12 for clarity of illustration.

When the chute subframe is in fully retracted or solid line position in FIG. 11, the bales as they reach the top of the chute, tip longitudinally forwardly. In this operation the topmost roller 89aa acts as a fulcrum for the tilting operation and the rearward end of the bale continues to be lifted by lugs 116a of the chute chains 108a so that the bale tilts from the position indicated by reference numeral 18x to the position indicated by reference numeral 18y. A curved rod 171 may be moved into position curving forwardly to facilitate such movement. In the latter position, the forward end of the bale rests against pusher bar 162a. It will thus be seen that the bales are deposited along the forward edge of loading platform 101a disposed with one of their 16 x 48 inch side bottommost. To form the lowermost pair of bales, no tilting is required. Hence, the transverse pusher cylinder 137a is energized to push the bales transversely inwardly of the machine and into position along the right-hand edge of loading platform 101a. The next bale is then deposited in the same position as that first described and is sequentially pushed onto the loading platform 101a pushing the first bale to the left. Thus to form the first row of the bottom layer of bales, six bales are pushed off of loading platform 101a in a row. Thereupon the rearward push cylinder 162a is energized pushing the first row rearwardly. Another row of six bales is positioned similarly to the first and this second row of six is pushed rearwardly by the rearward pusher for 162a until all twelve bales of the layer are moved off loading platform 101a and onto elevator platform 46a (see FIG. 8).

To form the second layer of bales, as each bale 18y reaches the position indicated in solid lines in FIG. 11 it is tilted to rest upon one of its 23 x 48 inch faces by first energizing cylinder 139a and then cylinder 137a. The tilting and lateral pushing of the bales is the same essentially as in the modification of FIGS. 1–5. Four bales are collected in the first row and then pushed rearwardly by the longitudinal push bar 162a for a distance of one bale. Thereupon a second row of four bales is formed in the same manner as the first row. Thereafter the push bar 162a is pushed rearwardly, pushing the second row of four bales off of loading platform 101a and simultaneously pushing the first row ahead of it (FIG. 9).

To form a tie layer (third layer), the first two transverse bales are deposited on the rearward edge of the loading platform by retracting the upper section members 121a of the front of the chute to solid line position and placing the bale turning bar 143a in operative position and bar 171 to inoperative position. Thereafter four bales are deposited in a row in the same manner as each of the rows of the second layer. Thereafter, the longitudinal push bar cylinder 162a is energized pushing the row of four longitudinal bales rearwardly and pushing the two transverse bales rearward a sufficient distance to provide clearance for the next two bales. The subframe members 121a are moved to projected position and the bale turning rod 143a to operative position and two transverse bales are deposited in the same manner as the first two transverse bales. Thereupon the longitudinal push cylinder 162a is energized pushing the entire layer of eight bales off of the loading platform and onto a position on top of the second layer (FIG. 10). The fourth layer may be constructed as the second, the fifth as the third, and the sixth and seventh as the second. The stack is discharged from platform 46 as in the modification of FIGS. 1–6.

What is claimed is:

1. Bale stacking apparatus comprising a frame, an elevator platform vertically reciprocable in said frame, a stationary platform on said frame longitudinally remote from said elevator platform and disposed extending horizontally at least as high as the upper limit of elevation of said elevator platform, an elevator chute on said frame extending from ground level up to the level of said stationary platform, said chute having the cross-sectional dimension of a conventional bale and having a back, sides and a front all extending rearwardly and upwardly from the ground to the top of said chute, at least one continuous elevator conveyor chain having lift lugs, means mounting said chain above said back, chain drive means to lift bales up to the top of said chute, an extension on the upper end of said front pivotally mounted on said chute, first actuating means for moving said extension between a first position extending above said platform and slanted rearwardly and a second position slanted forwardly whereby bales lifted to the top of said chute are diverted when said extension is in second position to a longitudinally disposed position on said stationary platform, bale turning means at the top of said chute, second actuating means moving said bale turning means between an operative position extending over the top of said chute and toward said stationary platform and an inoperative position, said bale turning means when in operative position while said extension is in first position diverting bales lifted to the top of said chute to a transversely disposed position on said stationary platform.

2. Apparatus according to claim 1, which further comprises a transverse horizontal transfer means disposed to transfer bales transversely inwardly across said stationary platform.

3. Apparatus according to claim 2, in which said transfer means comprises a continuous chain extending across a portion of said stationary platform.

4. Apparatus according to claim 2, in which said transfer means comprises a horizontal transverse cylinder having a rod and a push bar on said rod.

5. Apparatus according to claim 2, which further comprises bale tilt means operative to tilt a longitudinally disposed bale about a longitudinal axis of said bale as said bale is transferred inwardly.

6. Apparatus according to claim 1, which further comprises a longitudinal pusher bar and means for reciprocating said bar to move bales off said stationary platform and discharge said bales onto said elevator platform.

References Cited

UNITED STATES PATENTS

| 2,977,002 | 3/1961 | Asp. |
| 3,085,696 | 4/1963 | Stainforth et al. |
| 3,182,783 | 5/1965 | Smoker. |
| 3,197,043 | 7/1965 | Unger. |
| 3,400,839 | 9/1968 | Jay et al. |

GERALD M. FORLENZA, Primary Examiner

ROBERT J. SPAR, Assistant Examiner

U.S. Cl. X.R.

214—1, 519